United States Patent [19]
Anders et al.

[11] Patent Number: 5,277,529
[45] Date of Patent: Jan. 11, 1994

[54] SENSOR-CONTROLLED DEBURRING AND CUTTING SENSOR TO CARRY OUT THE PROCESS

[75] Inventors: Michael Anders; Ralf Sikora, both of Berlin, Fed. Rep. of Germany

[73] Assignee: INPRO Innovationsgesellschaft für fortgeschrittene Produktions-systeme in der Fahrzeugindustrie mbH, Berlin, Fed. Rep. of Germany

[21] Appl. No.: 908,489

[22] Filed: Jun. 30, 1992

Related U.S. Application Data

[63] Continuation-in-part of Ser. No. 656,098, Apr. 4, 1991, abandoned.

[30] Foreign Application Priority Data

Jun. 18, 1989 [DE] Fed. Rep. of Germany ....... 3919977

[51] Int. Cl.$^5$ .............................................. B23C 3/00
[52] U.S. Cl. ........................................ 409/131; 51/5 B; 51/165.77; 364/474.02; 407/53; 409/133; 409/193; 409/140

[58] Field of Search .............. 409/131, 132, 133, 139, 409/140, 193, 195, 194, 207, 209, 217, 79, 80, 84; 407/32, 53, 54; 51/5B, 181R, 165.77, 165.76, 165.71; 364/474.02, 474.14, 474.15, 474.37

[56] References Cited

FOREIGN PATENT DOCUMENTS

| 642136 | 1/1979 | U.S.S.R. | .............................. 409/195 |
| 1397249 | 5/1988 | U.S.S.R. | .............................. 409/131 |
| 753233 | 7/1956 | United Kingdom | .................. 407/54 |

Primary Examiner—Daniel W. Howell
Attorney, Agent, or Firm—Wenderoth, Lind & Ponack

[57] ABSTRACT

The invention relates to a sensor-system for metal workpieces, especially cast components (casting cleansing), and a cutting sensor for its implementation, and is intended to improve deburring quality rationally and effectively. To this end, relatively coarse burrs are cut off to a predetermined height and the remaining burrs and also the relatively small ones are removed by sensor control in a single pass by a combined tool having sensor cutter and a burr pre-cutter.

10 Claims, 2 Drawing Sheets

SENSOR-CONTROLLED DEBURRING AND CUTTING SENSOR TO CARRY OUT THE PROCESS

This application is a continuation-in-part of now abandoned application Ser. No. 07/656,098, filed on Apr. 4, 1991.

BACKGROUND OF THE INVENTION (1) Field of the Invention

The invention relates to sensor-controlled deburring of metallic workpieces, in particular the cleaning of castings by face milling, in which process the axis of a tool is tilted relative to a normal line on the surface of a base material of a workpiece, the tool and workpiece being electrically isolated from one another. An electrical voltage is applied at least between one part of the tool and the workpiece. The tool engages with the workpiece under numerical control. The time of contact of a cutting edge with the workpiece is evaluated independently of the speed of the tool during its control as a measure of the width of the tool mark and thus the penetrating depth of the tool when deburring relatively small flashes.

The invention also relates to a cutting sensor for conducting sensor-controlled deburring of metallic workpieces, in particular of castings of the aformentioned kind. The cutting sensor is formed by a workpiece, a sensor cutter that engages with the workiece and whose longitudinal axis is sloped relative to the normal line on the surface of the base material of the workpiece, and an evaluating unit connected to the sensor cutter. The workpiece or the sensor cutter is electrically isolated from its environment and has a measurement voltage applied thereto.

(2) State of the Prior Art

Castings are fraught with tolerances. The cast blanks are far from being at a required defined geometry owing to gating systems and flashes of various shapes and heights. Therefore, the castings must be deburred and smoothed by cleaning. This is predominantly done manually, since acceptable machining results are obtained only in exceptional cases when castings are cleaned automatically, owing to defective compensation for tolerances.

For automatic cleaning of castings with numerically controlled (NC) machine tools, the object is to follow the contour of the workpiece and remove the gating systems and flashes.

Since the flashes vary in shape, width and height with large tolerances, a constantly high cleaning quality can be achieved in numerically controlled automated procedures only with sensors. They monitor the deviation of the actual shape of the flash and its position from a predetermined tolerance value and must correspondingly correct the deburring process.

Previous attempts started from force measurements, performance measurements and optical measurements. None of these principles led to results that would be comparable to those of a cutting sensor. With a cutting sensor it is possible to measure these deviations directly and to compensate with suitable procedures. A known sensor-controlled deburring of the aforementioned kind (M. Weck and J.-P. Fürba, VDI-Z., Vol. 128 (1986), no. 22, pp. 879–883) has been proven to have the drawback that it no longer functions when there are large bent-over flashes. If in the case of relatively high flashes, the cutter bends over during this contact measurement, the contact time is no longer determined by the base material but rather by the bent over flash. In this manner the automatically guided sensor cutter is led astray.

SUMMARY OF THE INVENTION

The goal of the present invention is a sensor cutter which recognizes with the simplest manipulation even extremely high flashes and machines them from the base material.

The object of the invention is to design a sensor-controlled deburring and a cutting sensor to carry out the aforementioned process such that the deburring quality is increased in an efficient and effective manner.

This problem is solved by the invention in that, in one operation of a tool, the relatively high flash, projecting above a predetermined height over the surface of the base material of the workpiece, is cut off to a predetermined height, and the remaining residual flash is machined under sensor control in accordance with the deburring of relatively small flashes.

Advantageously, the relatively high flashes are premilled to the predetermined height. The workpiece and the tool are electrically isolated and supplied with a measurement voltage of 15 volts.

Preferably when deburring the premilled residual flashes and/or the relatively small flashes, speed-independent measurement is made of the cutting width and thus, via the geometry of the sensor cutter, the penetrating depth of the tool via the formation of a ratio between the contact time of the cutting edge and the time in which the cutting edge does not engage with the workpiece, is determined.

The cutting sensor of the invention, in order to conduct the sensor-controlled deburring of metallic workpieces, in particular of castings, of the aforementioned kind, is characterized by the fact that on the sensor cutter is mounted a flash roughing cutter, whose longitudinal axis coincides with that of the sensor cutter, and that the sensor cutter and the flash roughing cutter are electrically isolated from one another, and at least the sensor cutter is connected to ground or the measurement voltage via a contact.

Preferably the tool comprises the sensor cutter combined with the roughing cutter. The two cutters are mounted one on top of the other. The sensor cutter and the roughing cutter are also electrically isolated from one another, as noted above. Flashes that are higher than a specific amount are milled by the roughing cutter to the extent that the measurement of the cutting width between the base material and the premilled residual flash is not affected by the sensor cutter.

The workpiece and the cutters are electrically isolated from their environment and supplied with a measurement voltage of +15 volts. The sensor cutter is connected to ground or +15 volts by means of a slip ring and, as is typical in the case of electrical machines, with carbon brushes. The number of cutting edges of the cutters is such that only one cutting edge is always engaged and closes the circuit. The cutting edges are advantageously perpendicular to the side line of the cutter in order to obtain as accurate as possible a measurement of the contact time.

In contrast, the cutting edges of the roughing cutter can be any appropriate shape, since this cutter is polled only upon flash contact. When contact is made, the feed rate can be decreased by a constant value or a speed-dependent feedrate control. Preferably, the angle of slope of the longitudinal axis of the sensor cutter ranges from 10° to 60°.

The advantages targeted with the invention for the automatic cleaning of castings are:
- accurate measurement of the cutting width when milling; this is a prerequisite for achieving a high machining quality when cleaning castings,
- fast measurement of the parameters of the sequence of operation,
- good machining of the workpiece, regardless of shape and size of the flash,
- simplest construction, manipulation and integration into existing systems, and
- low manufacturing costs.

BRIEF DESCRIPTION OF THE DRAWINGS

One advantageous embodiment of the cutting sensor of the invention is explained in detail below together with the accompanying drawings, wherein.

DETAILED DESCRIPTION OF THE PREFERRED EMBODIMENTS

Figure 1:
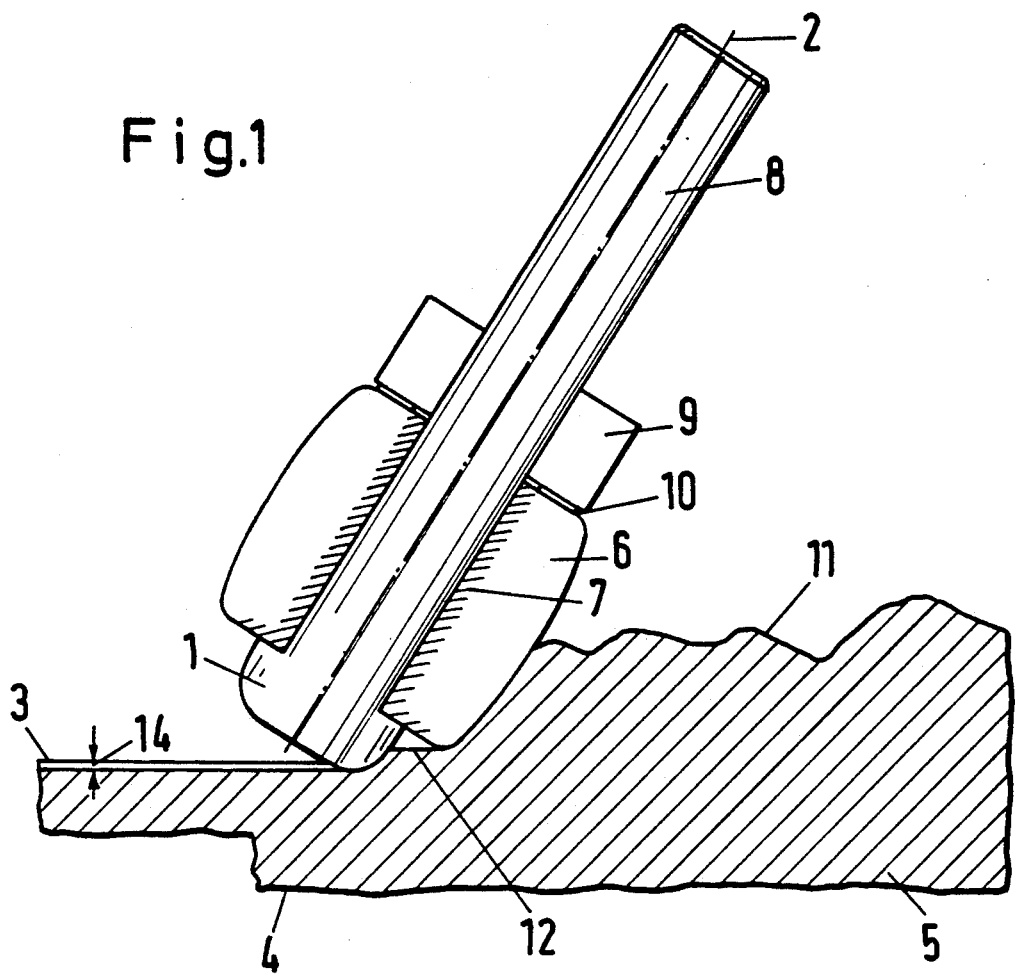
FIG. 1 is a front elevational view of a cutting sensor in use without its evaluating unit.
Figure 2:
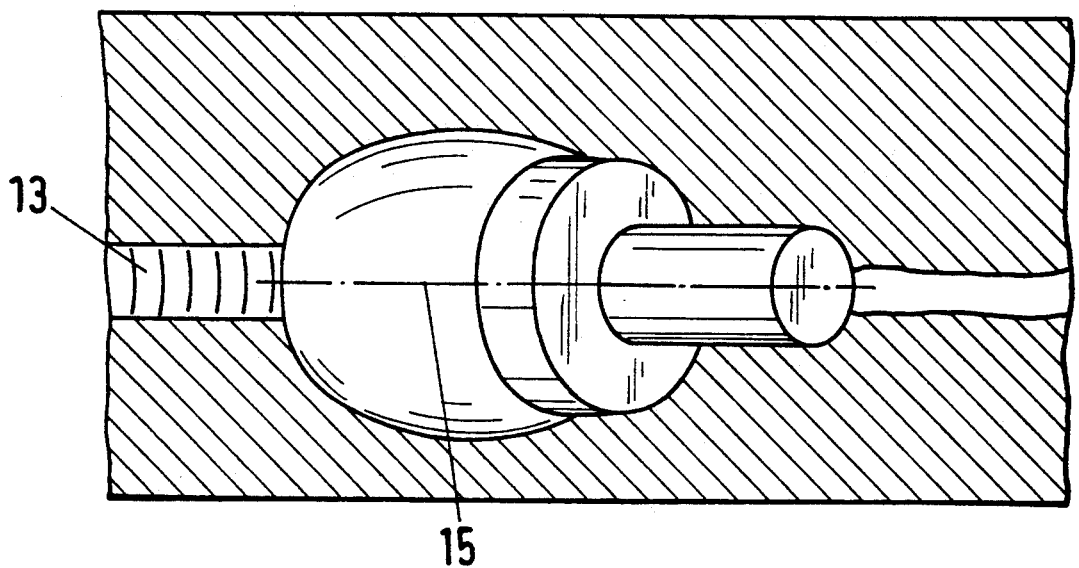
FIG. 2 is a view of the cutting sensor of FIG. 1 as seen from above.

As is apparent from FIG. 1, a cutting sensor has a sensor cutter 1 with a longitudinal axis 2 sloped with respect to the normal line on a surface 3 of a base material 4 of a workpiece 5. The workpiece 5, together with the sensor cutter 1 and an evaluating unit (not illustrated) connected to the sensor cutter 1, form the cutting sensor. On the sensor cutter 1 is mounted a roughing cutter 6, which may be a grinding wheel, whose longitudinal axis coincides with the longitudinal axis 2 of the sensor cutter 1, and which is electrically isolated from the sensor cutter 1 by electrical insulation 7. Sensor cutter 1 is made of HM or HSS steel. The diameter of the roughing cutter 6, which can be made of ceramic, a nonconducting material, is greater than that of sensor cutter 1. Cutting edges 21 of the sensor cutter are perpendicular to its side line 22, but the cutting edges of roughing cutter 6 can be any appropriate shape. On a shaft 8 of the sensor cutter 1 is mounted, above the roughing cutter 6, a contact block 9, which is insulated with a layer of insulation 10 from the roughing cutter 6.

During sensor-controlled deburring, relatively high flashes 11, which project above a predetermined height above the surface 3 of the base material 4 of the workpiece 5, are premilled by the roughing cutter 6 to the predetermined height, and the remaining residual flash 12 and the flashes of relatively small height are machined by the sensor cutter 1 in one operation of the combined tool. The time of contact of the cutting edges 21 of the sensor cutter 1 serves as the size for the width of a tool mark 13 and thus for the cutting depth 14 of the tool in the base material of the workpiece. The sensor cutter 1 and the workpiece 5 are electrically insulated from each other except for contact between the cutting edges 21 and the workpiece 5.

Figure 3:
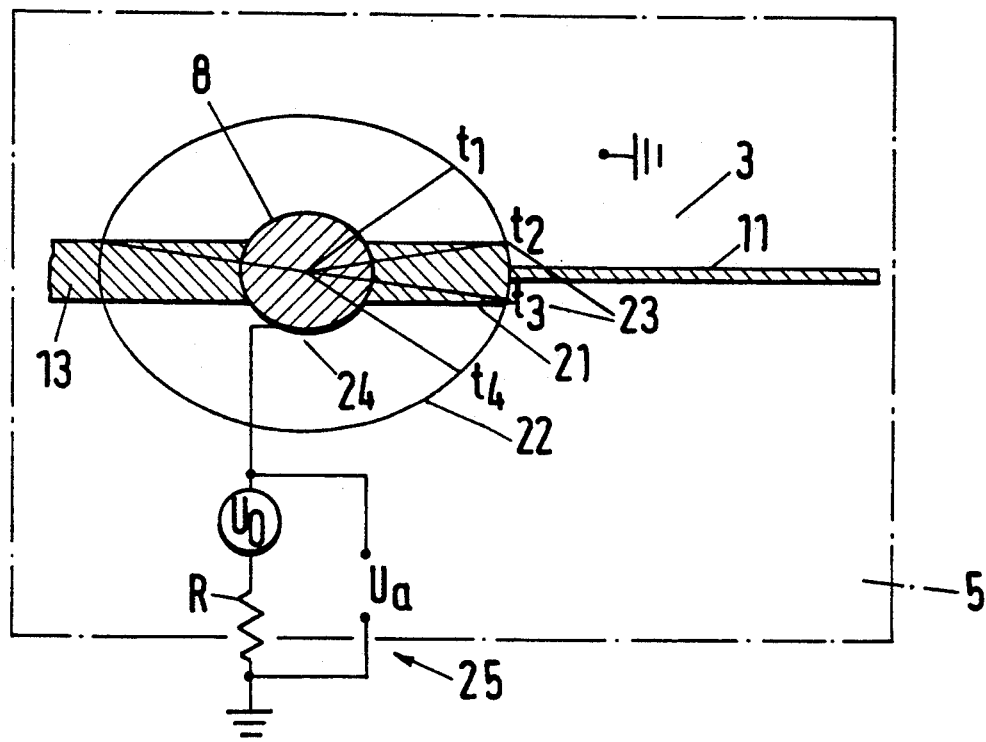
FIG. 3 is a schematic view of the cutting sensor of FIG. 1 together with an arrangement for measuring the cutting width of the cutting sensor.

FIG. 3 schematically illustrates an arrangement for measuring the cutting width or tool mark 13 of the sensor cutter 1. The flashes on the surface 3 of the workpiece 5 are machined by the active cutting edges 21 of the sensor cutter 1 across an engaging arc 23 to form the tool mark cutting width 13. The shaft 8 of the sensor cutter 1 has a slide contact 24 in contact therewith for electrically connecting the active cutting edges 21 with a measurement circuit 25. The measurement circuit 25 provides an initial voltage source $U_0$, the source of the voltage is connected in series with a resistor R, and the potential is measured across the source of the voltage $U_0$ and the resistor and designated as $U_a$. The other side of the circuit 25 is connected to ground along with the surface 3 of the workpiece 5, as illustrated. Thus, each time the active cutting edge 21 engages the surface 3 of the workpiece 5, the circuit 25 is closed. Of course the workpiece 5 and the cutting edges 21 are electrically isolated from the remainder of their environment. The measurement voltage supplied is +15 volts. The number of the cutting edges is chosen so that only one cutting edge is always engaged and closes the contact of the circuit 25. The cutting edges 21, as noted above, are most advantageously perpendicular to the side line of the sensor cutter 1 overall in order to obtain as accurate as possible a measurement of the contact time. When the cutting edges 21 contact the workpiece, the measured voltage becomes 0 by reason of the short circuit by the active cutting edges. The measurement voltage, it is noted, is applied across the workpiece 5 and the shaft 8 or the contact block 9 of the sensor cutter 1.

Figure 4:
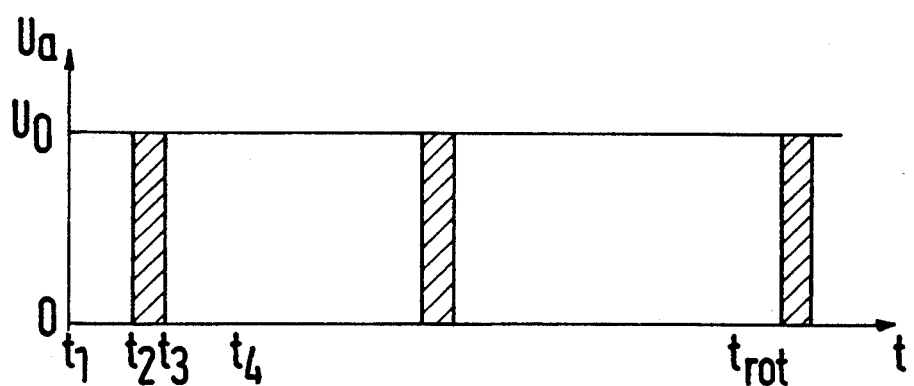
FIG. 4 is a graph showing time versus voltage in the measuring of the time of contact of the cutting edges of the cutting sensor of FIG. 1 with the circuit of FIG. 3.

FIG. 4 shows a graph of the voltage versus the time of contact.

Noting the time designations in FIG. 4, it can be seen that a time of contact $T_k$ of an active cutting edge 21 can be designated by $T_k = T_3 - T_2$. The time of rotation (the amount of time used in one rotation, equal to 1/r.p.m.) being designated $T_{rot}$, the contact relationship is designated by $T_{kn} = T_k/T_{rot}$, where $T_{kn}$ is thus a designation that is independent of the speed, or revolutions per minute, of the sensor cutter 1. The designation $T_{kn}$ could be extended by bent-over flashes, but the bent-over flashes are first removed by the roughing cutter 6. As can be seen, the cutting width is thus essentially designated by determining $T_3 - T_2$, $T_3 - T_2$ being proportional to the cutting width.

In FIG. 4, the second dashed line represents one cycle, or rotation, of the cutting edges 21, or $T_{rot}$, starting from $T_2$. The darkened areas represent the time of contact, e.g. $T_2$ to $T_3$, wherein the cutting edges 21 contact the workpiece.

The relationship between the penetrating depth of the sensor-cutter 1 and the cutter width 13, by the geometry of the sensor cutter 1, is provided by the circumference of the sensor cutter 1. If the cutting width is constant, the penetrating depth of the sensor cutter 1 becomes greater with a decreasing radius of the sensor cutter 1, and with an increasing angle of the slope of the longitudinal axis of the sensor cutter 1.

The principles of the above-illustrated measurement circuit can be used in parallel connection with the roughing cutter 6 to obtain information relating to the flash 11 without impairing the measurement circuit 25 for measuring the cutting width 13 of the sensor cutter 1. The flash rouging cutter 6 is not part of the measurement circuit 25 for measuring the cutting width 13, however.

We claim:

1. A process of deburring a metal workpiece, comprising:

providing a workpiece having a flash to be deburred;
providing a tool having at least one cutting edge and an axis inclined relative to a normal line on the surface of said workpiece;
engaging said tool with said workpiece under numerical control and machining the flash by cutting off relatively high burrs projecting beyond a predetermined height over the surface of said workpiece to said predetermined height and machining off remaining residual burrs of said flash at or below said predetermined height while controlling said tool to a certain depth of penetration into the surface of said workpiece, the depth of penetration being determined from the time of contact of said cutting edge with said workpiece, said time of contact corresponding to the width of the cutting mark of said tool and being evaluated by applying and measuring a voltage across said workpiece and said tool.

2. The process of claim 1, wherein said relatively high burrs are machined off before said remaining residual burrs.

3. A cutting sensor for deburring a metal workpiece, comprising:
a sensor cutter having a longitudinal axis; and
a roughing cutter having a longitudinal axis coincident with the longitudinal axis of said sensor cutter and mounted on said sensor cutter, said roughing cutter and said sensor cutter being electrically insulated from each other.

4. The cutting sensor of claim 3, wherein said roughing cutter is a grinding wheel.

5. The cutting sensor of claim 3, wherein said roughing cutter has a larger diameter than said sensor cutter.

6. The cutting sensor of claim 5, wherein said sensor cutter comprises a shaft and said roughing cutter surrounds said shaft.

7. The cutting sensor of claim 6, wherein said sensor cutter and said roughing cutter are fixed relative to each other and both have cutting edges adapted to cut upon rotation of said sensor cutter and said roughing cutter about their longitudinal axes.

8. The cutting sensor of claim 5, wherein said roughing cutter is made of a nonconducting material.

9. The cutting sensor of claim 8, wherein said nonconducting material is ceramic.

10. The cutting sensor of claim 3, wherein said sensor cutter has a contact block mounted thereon above said roughing cutter.

* * * * *